US010375202B2

(12) United States Patent
Gopal et al.

(10) Patent No.: US 10,375,202 B2
(45) Date of Patent: Aug. 6, 2019

(54) DATABASE SELECTION IN DISTRIBUTED COMPUTING SYSTEMS

(71) Applicant: Microsoft Technology Licensing, LLC, Redmond, WA (US)

(72) Inventors: Burra Gopal, Bellevue, WA (US); Krishna Raghava Mulubagilu Panduranga Rao, Bellevue, WA (US); Darell Macatangay, Redmond, WA (US); Patrick Kabore, Redmond, WA (US); Ramanathan Somasundaram, Bothell, WA (US); Constantin Stanciu, Redmond, WA (US); Sean Squires, Edmonds, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 288 days.

(21) Appl. No.: 15/499,412

(22) Filed: Apr. 27, 2017

(65) Prior Publication Data
US 2018/0314720 A1 Nov. 1, 2018

(51) Int. Cl.
*G06F 16/00* (2019.01)
*H04L 29/08* (2006.01)
(Continued)

(52) U.S. Cl.
CPC ............... *H04L 67/32* (2013.01); *G06F 7/08* (2013.01); *G06F 16/27* (2019.01); *H04L 67/10* (2013.01); *G06F 16/252* (2019.01)

(58) Field of Classification Search
CPC . G06F 9/505; G06F 16/27; G06F 7/08; G06F 16/252; H04L 67/10
See application file for complete search history.

(56) References Cited

U.S. PATENT DOCUMENTS 5,978,577 A 11/1999 Rierden et al.
6,119,143 A 9/2000 Dias et al.
(Continued)

OTHER PUBLICATIONS

Raju Srestha,"High Availability and Performance of Database in the Cloud Traditional Master-slave Replication versus Modern Cluster-based Solutions", 2017, SCITEPRESS—Science and Technology Publications, pp. 385-392 (Year: 2017).*
(Continued)

*Primary Examiner* — Merilyn P Nguyen
(74) *Attorney, Agent, or Firm* — Liang IP, PLLC

(57) ABSTRACT

Techniques for database selection during site provisioning in distributed computing systems are disclosed herein. In one embodiment, a method can include receiving a user request for a site to be hosted on one or more nodes in the distributed computing system. In response to the received user request, one of the databases is selected by randomly selecting a set of databases from a list of available databases, determining a subset of databases each having a lower level of database load than the other databases from the set of databases, and randomly selecting one database from the subset of databases. The method further includes storing a configuration file for the site in the randomly selected one database to enable the site to be accessible, the configuration file containing data representing one or more of module loading control, security configuration, session state configuration, application language, or compilation setting of the site.

20 Claims, 11 Drawing Sheets

(51) Int. Cl.
*G06F 7/08* (2006.01)
*G06F 16/27* (2019.01)
*G06F 16/25* (2019.01)

(56) References Cited

U.S. PATENT DOCUMENTS

| | | | |
|---|---|---|---|
| 6,950,848 B1 | 9/2005 | Yousefi'zadeh | |
| 7,461,147 B1 | 12/2008 | Mowat et al. | |
| 9,053,167 B1 | 6/2015 | Swift et al. | |
| 9,483,510 B2 | 11/2016 | Sitaram et al. | |
| 2003/0154236 A1* | 8/2003 | Dar | H04L 67/1002 709/201 |
| 2003/0212660 A1* | 11/2003 | Kerwin | G06F 16/252 |
| 2004/0229199 A1* | 11/2004 | Ashley | G09B 7/00 434/323 |
| 2008/0072226 A1* | 3/2008 | Armes | G06F 9/505 718/101 |
| 2011/0276695 A1* | 11/2011 | Maldaner | G06F 9/5083 709/226 |
| 2012/0284296 A1* | 11/2012 | Arifuddin | H04L 67/1027 707/769 |
| 2012/0297237 A1* | 11/2012 | Chatterjee | G06F 16/252 714/4.1 |
| 2013/0166638 A1* | 6/2013 | Theado | G06Q 20/027 709/204 |
| 2015/0324222 A1* | 11/2015 | Little | H04L 29/08 718/101 |
| 2018/0007002 A1* | 1/2018 | Landgraf | H04L 12/66 |

OTHER PUBLICATIONS

Kinuta, et al., "Server Selection Techniques for Distributed Information Retrieval", http://ciir.cs.umass.edu/pubfiles/r-294.pdf, Published on: 2003, 10 pages.

Kostic, et al., "Using Random Subsets to Build Scalable Network Services", In Proceedings of USENIX Symposium on Internet Technologies and Systems, Mar. 26, 2003, 14 pages.

* cited by examiner

DATABASE SELECTION IN DISTRIBUTED COMPUTING SYSTEMS

BACKGROUND

Content management systems are computing systems that can support management of digital content by users. Common features of content management systems include web-based publishing, format management, history editing and version control, indexing, searching, and retrieval. To provide such features, content management systems can utilize a collection of remote servers interconnected by one or more computer networks to provide computing, storage, communications, or other functionalities. During operation, one or more remote servers can cooperate to provide a distributed computing environment that facilitates activation and/or execution of various applications or features in order to provide desired functionalities of content management.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain content management systems, content and associated content management functionalities or features can be grouped into computer network accessible containers. One example container is a SharePoint® site, which is a web-addressable location to store, organize, share, and access content via, for example, an intranet or the Internet. A SharePoint® site can have features representing various functionalities and behaviors that can be activated or deactivated by site administrators. Such features can be used to expose content management functionalities as well as allowing users of the site to obtain data from external sources.

Configuration of the content and/or features of a site in a content management system can be stored as a configuration file in a content database. An example configuration file can be an ASP.NET web application with suitable instructions in an extensible markup language ("XML") document. The configuration file can that reside in a web configuration directory of the site and can contain data indicating behaviors of the site, such as module loading control, security configuration, session state configuration, application language, or compilation settings. The configuration file can also contain database connection strings or other suitable application specific items. During runtime, the configuration file can be retrieved from the content database, and the corresponding content and/or features can be rendered and provided to the user based on the retrieved configuration file.

A user can create such a site by providing user credentials and desired content and/or features of content management to a content management system. Upon verification, the content management system can provision for the requested site by placing a configuration file of the site in a content database. The content management system can also activate the requested features, appropriately secure the site, provide access to the site over a computer network, or perform other suitable provisioning operations. For instance, providing access to the site can include specifying IP addresses, IP Gateways, virtual networks, Domain Name System ("DNS") parameters, or other network parameters to suitable computer networks and storage resources. In another example, activating features can include first selecting one or more servers from a pool of available servers in datacenters, computing clusters, or other computing facilities. Images or copies of operating systems, device drivers, middleware, applications, or other suitable software components can then be located and provided to the selected servers. The software components can then be configured to generate a boot image for the selected servers. The servers can then start one or more virtual machines to load and execute the software components to provide the requested features.

Certain content management systems can have thousands even millions of content databases distributed in datacenters, computing clusters, or other computing facilities. To provide fast response to access requests to a site in such content management systems, the configuration file of the site may be stored in a content database that is not heavily loaded to allow ready access. A content database can be heavily loaded if the content database is storing a large number of configuration files and serving large numbers of corresponding retrieval, storage, or other database operations. However, determining a current load status of such large numbers of content databases during runtime may be impractical and inaccurate. For example, due to large numbers of databases, once a query request/response for load status is processed for one content database, other status data similarly obtained for other content databases may already be stale. Selection of content databases based on such stale data can cause imbalance in database loads in the computing clusters, datacenters, or other computing facilities.

One technique for monitoring database loads can include maintaining a central database that periodically or continuously query and/or receive load status data from the content databases. However, such a technique is not very scalable and can be a single point of failure. For example, for every database newly created or modified, a database record may need to be created or updated in the central database. As such, the size of the central database tend to inflate rapidly and thus causing access to the central database to be slow and unreliable. Also, any failure of the central database may render a site provisioning process to fail even though the content databases are still operational.

Several embodiments of the disclosed technology can address at least some of the foregoing drawbacks by implementing a randomized database selection technique without using a central database to track load status of distributed content databases. In certain embodiments, instead of load checking or enumerating all content databases available in a computing cluster or datacenter, a subset of a first number (M) of available content databases can be randomly selected. The first number M can be ten, twenty, thirty, or other suitable numbers that can be enumerated without excessive delays. The subset of M content databases can then be enumerated by, for example, transmitting query requests for load status and receiving query responses containing status data from the content databases. Based on the received status data, a second number (N) of databases with the lowest loads can be determined. The second number N can be two, three, four, five, or any other suitable number smaller than the first number M. In certain embodiments, one content database can then be randomly selected from the N determined content databases as a location to store a configuration file for the site. In other embodiments, one content database can also be selected from the N determined content databases based on historical failure, access latency, or other suitable criteria.

In certain embodiments, during enumeration of the selected M content databases, if enumeration of a third number (P) of content databases fail, the provisioning process can be interrupted or suspended. Such failure may indicate that a computing cluster or even a datacenter may be experiencing operating difficulties. In one embodiment, after a preset period, the enumeration of the content databases may be retried based on the same or newly selected M content databases. In other embodiments, if a number of failed databases exceeds the third number P, the provisioning process can be terminated. In all of the foregoing embodiments, one or more of the first number M, second number N, or the third number P can be adjusted by, for example, an administrator or a software component based on values of enumeration speed, database load distribution, or other suitable criteria.

Certain embodiments of the foregoing randomized database selection technique have been tested. The inventors have recognized that embodiments of the foregoing technique resulted in surprisingly even distributions of database loads among a large number of content databases without tracking load status with a central database or enumerating all of the content databases during runtime. No databases have been observed to have been overloaded with overly provisioned sites over an extended period of time. Several embodiments of the disclosed technology can also be failure tolerant. By omitting a central database for tracking status of content databases, failure of any one of the content databases would not cause the entire database selection process to fail.

DETAILED DESCRIPTION

Figure 1A:
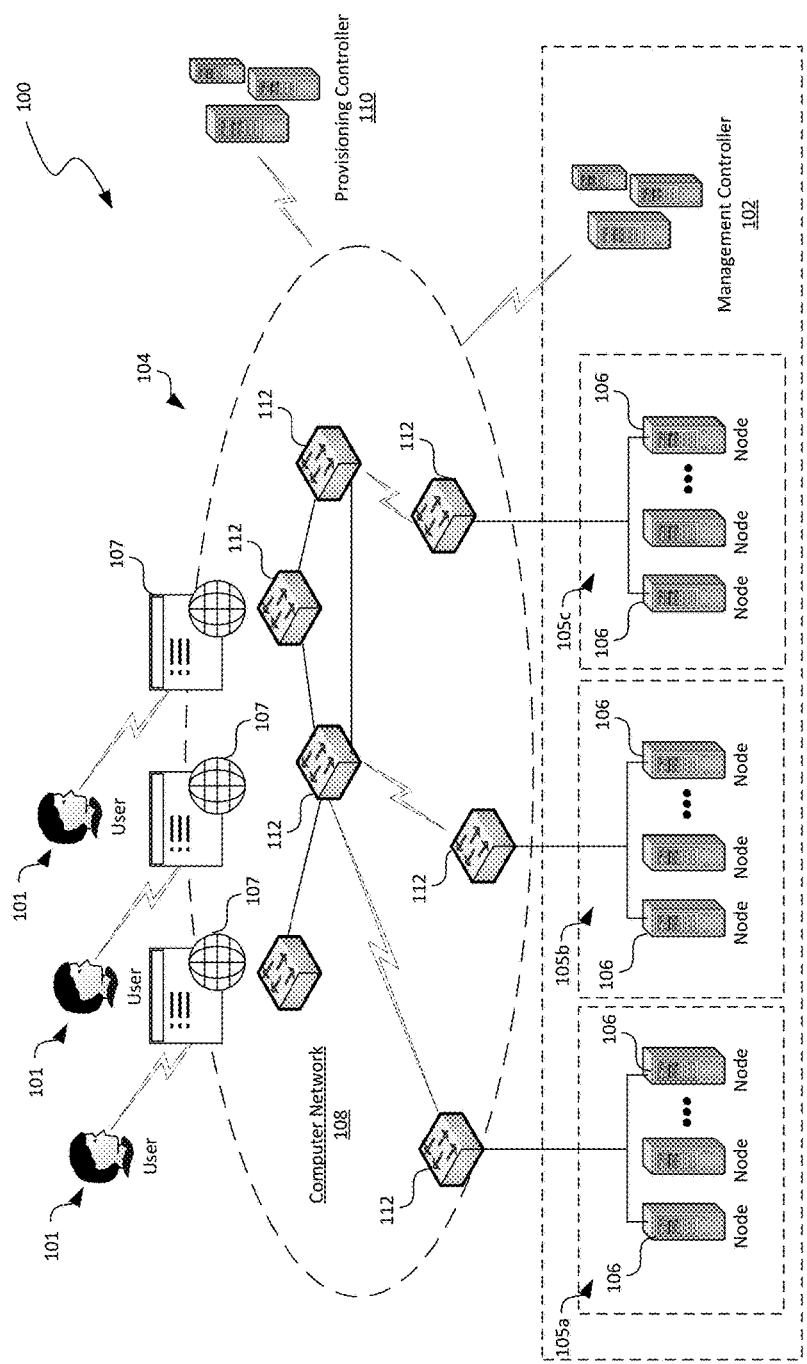
FIG. 1A is a schematic diagram of a distributed computing system implementing randomized database selection in accordance with embodiments of the disclosed technology.

Certain embodiments of computing systems, devices, components, modules, routines, and processes for randomized database selection in distributed computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1A-5.

As used herein, the term "computing cluster" generally refers to a computer system having a plurality of network devices that interconnect multiple servers or nodes to one another or to external networks (e.g., the Internet). One example of a computing cluster is one or more racks each holding multiple servers in a cloud computing datacenter (or portions thereof) configured to provide cloud services. One or more computing clusters can be interconnected to form a "computing fabric." The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. For example, a node can include a computing server having a hypervisor configured to support one or more virtual machines.

Also used herein, the term "cloud service" generally refers to computing resources provided over a computer network such as the Internet. Common examples of cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Further, as used herein, the term a "site" generally refers to a network accessible container having content and associated features of content management configured by a site owner. One example container is a SharePoint® site, which is a web-addressable location to store, organize, share, and access content via, for example, an intranet or the Internet. Configuration of a site can be stored in a database as a site record. For example, a configuration file can be an Active Server Pages ("ASP.NET") type web application having instructions written as an extensible markup language ("XML") document. The configuration file can that reside in a web configuration directory of the site and contain data about how the site behaves. Such data can include parameters for module loading control, security configuration, session state configuration, application language, or compilation settings. The configuration file can also contain specific items such as database connection strings or other suitable information. During runtime, the configuration file can be retrieved, and the corresponding content and/or features are rendered and provided to the user accordingly.

"Features" of a site are computer programs having codes that extend the functionality of the site in some ways. Features can be authored using HTML, JavaScript, CSS, or other web technologies. At a basic level, a feature of a site provides a user a way to create, inspect, monitor, delete, and configure content of the site, cloud assets, or other suitable resources. For example, a feature on a site can include a display of a list of news, documents, links, or other suitable types of content of the site. In another example, a feature can also include a computer program configured to retrieve data (e.g., weather forecast) from an external source and display/update the retrieved data on the site.

Also used herein, the term "site provisioning" or "provisioning" generally refers to a set of preparatory actions for providing a network accessible site requested by a user in a distributed computing system. For example, provisioning can include placing a configuration file of the site in a content database, activating the requested features, appropriately securing the site, and providing access to the site over a computer network. In another example, provisioning can also include selecting one or more servers from a pool of available servers in datacenters, computing clusters, or other computing facilities. Provisioning can also include locating and providing access to images of operating systems, device drivers, middleware, applications, or other suitable software components related to the cloud services. The images of the software components can then be configured to generate a boot image for the selected servers. Provisioning can further include assigning IP addresses, IP Gateways, virtual networks, DNS servers, or other network parameters to the selected servers and/or executed software components. The servers can then load and execute the software components in order to provide features of the site.

In certain computing systems, determining a current load status of or "enumerating" during runtime large numbers of content databases or other suitable types of databases may be impractical and inaccurate. For example, due to large numbers of databases, once a database is enumerated to obtain status data of the database, other status data similarly obtained for another database may be already inaccurate because of a long delay between enumerating the databases. Selection of databases based on such inaccurate status data can cause load imbalance in the computing clusters, datacenters, or other computing facilities.

Several embodiments of the disclosed technology can address at least some of the foregoing drawbacks by implementing randomized database selection without using a central database. In certain embodiments, instead of enumerating all or a large number of databases available at a computing cluster or datacenter, a subset of a first number (M) of available databases can be randomly selected. The first number M can be ten, twenty, thirty, or other suitable numbers that can be readily enumerated. The subset of M databases can then be enumerated by, for example, transmitting query requests for load status and receiving query responses containing status data. Based on the received status data from at least some of the M databases, a second number (N) of databases with the lowest loads can be determined. The second number N can be two, three, four, five, or any other suitable number smaller than the first number M. In certain embodiments, of the N determined databases, one database can then be randomly selected to store the configuration file for the provisioned site. In other embodiments, one database can be selected from the N determined databases based on historical failure, access latency, or other suitable criteria. Several embodiments implementing such randomized database selection resulted in surprisingly even distribution of database loads among a large number of databases, as described in more detail below with reference to FIGS. 1A-5.

FIG. 1A is a schematic diagram illustrating a distributed computing system 100 implementing randomized database selection in accordance with embodiments of the disclosed technology. In certain embodiments, the distributed computing system 100 can be a content management system. In other embodiments, the distributed computing system 100 can also be other suitable types of computing system. As shown in FIG. 1A, the distributed computing system 100 can include an computer network 108 interconnecting a plurality of users 101, a computing fabric 104, and a provisioning controller 110. Even though particular components of the computing system 100 are shown in FIG. 1A, in other embodiments, the distributed computing system 100 can also include additional and/or different constituents. For example, the distributed computing system 100 can also include additional computing fabrics (not shown) interconnected with one another, network storage devices, utility infrastructures, and/or other suitable components. Though the provisioning controller 110 is shown as a separate entity from the management controller 102, in other embodiments, one or more functions of the provisioning controller 110 can be performed by the management controller 102 or other suitable components in the distributed computing system 100.

As shown in FIG. 1A, the computer network 108 can include one or more physical network devices 112 that interconnect the users 101, the computing fabric 104, and the provisioning controller 110. Examples of the network devices 112 can include routers, switches, firewalls, load balancers, or other suitable network components. Even though particular connection scheme is shown in FIG. 1A for illustration purposes, in other embodiments, the network devices 112 can be operatively coupled in a hierarchical, flat, "mesh," or other suitable topologies.

The computing fabric 104 can also include a management controller 102 and a plurality of nodes 106 operatively coupled to one another by the network devices 112. In certain embodiments, the nodes 106 can individually include a processor, a physical server, or a blade containing several physical servers. In other embodiments, the nodes 106 can also include a virtual server or several virtual servers. The nodes 106 can be organized into racks, availability zones, groups, sets, computing clusters, or other suitable divisions. For example, in the illustrated embodiment, the nodes 106 are grouped into three computing clusters 105 (shown individually as first, second, and third computing clusters 105a-105c, respectively), which are operatively coupled to corresponding network devices 112 in the computer network 108. Even though three computing clusters 105 are shown in FIG. 1A for illustration purposes, in other embodiments, the computing fabric 104 can include one, two, eight, sixteen, or any other suitable numbers of computing clusters 105 with similar or different components and/or configurations.

The management controller 102 can be configured to monitor, control, or otherwise manage operations of the nodes 106 in the computing clusters 105. For example, in certain embodiments, the management controller 102 can include a fabric controller configured to manage processing, storage, communications, or other suitable types of hardware resources in the computing clusters 105 for hosting cloud services. In other embodiments, the management controller 102 can also include a datacenter controller, application delivery controller, or other suitable types of controller. In the illustrated embodiment, the management controller 102 is shown as being separate from the computing clusters 105. In other embodiments, the management controller 102 can include one or more nodes 106 in the computing clusters 105. In further embodiments, the management controller 102 can include software services hosted on one or more of the nodes 106 in the computing clusters 105.

The provisioning controller 110 can be configured to implement randomized database selection during site provisioning in the distributed computing system 100. Site provisioning can include receiving a user request for a site with a list of requested features for the site. In response to the received user request, multiple provisioning stages are performed by, for example, the management controller 102, to provide a site by the distributed computing system 100. Concurrently with, separately from, or in other suitable orders, the provisioning controller 110 can also be configured to select a database 145 (shown in FIG. 1B) in the distributed computing system 100 for storing a configuration file corresponding to the provisioned site, as described in more detail below with reference to FIG. 2A-2D.

In operation, the users 101 can request deployment of sites via, for example, user portals 107. In response, the provisioning controller 110 and the management controller 102 can cooperate to provision the requested sites by the users 101. For example, the management controller 102 can identify a list of requested content and/or features by the users 101 and create a configuration file according to which the requested sites can be provided to the users 101.

The provisioning controller 110 can also select a database 145 in the distributed computing system 100 to store the created configuration file of a requested site. In certain embodiments, instead of enumerating all databases 145 available in the distributed computing system 100, the provisioning controller 110 can randomly select a subset of a first number (M) of available databases 145 in the distributed computing system 100. The first number M can be ten, twenty, thirty, or other suitable numbers. The provisioning controller 110 can then enumerate the subset of M databases 145 by, for example, transmitting query requests for load status and receiving query responses containing status data. Based on the received status data, the provisioning controller 110 can determine a second number (N) of databases 145 with the lowest loads. The second number N can be two, three, four, five, or any other suitable number smaller than the first number M. In certain embodiments, the provisioning controller 110 can then randomly select one database 145 from the N determined databases 145 and inform the management controller 102 to store the created configuration file for the requested site at the selected one database 145. In other embodiments, the provisioning controller 110 can select the one database 145 from the N determined databases 145 based on historical failure, access latency, or other suitable criteria. Details of certain components and operations of the provisioning controller 110 are described below with reference to FIGS. 2A-2D.

Figure 1B:
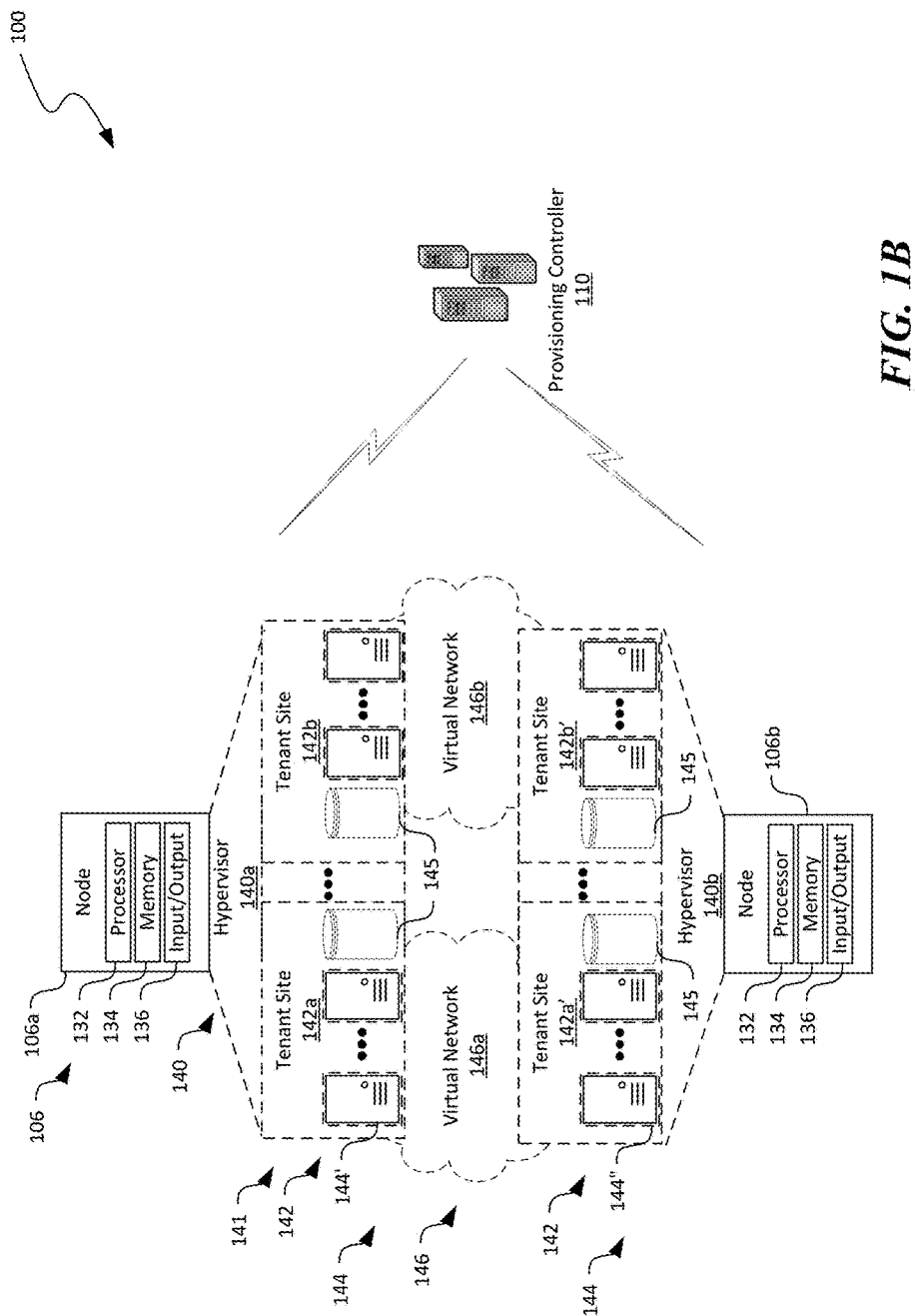
FIG. 1B is a schematic diagram illustrating certain hardware/software components of the distributed computing system of FIG. 1A in accordance with embodiments of the disclosed technology.

FIG. 1B is a schematic diagram illustrating certain hardware/software components of the distributed computing system 100 of FIG. 1A in accordance with embodiments of the disclosed technology. In FIG. 1B, only certain components of the computer network 108 of FIG. 1A are shown for clarity. As shown in FIG. 1B, the first node 106a and the second node 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIG. 5). The input/output component 136 can include a display, a touch screen, a keyboard, a mouse, a printer, and/or other suitable types of input/output devices configured to accept input from and provide output to an operator and/or an automated software controller (not shown).

The memory 134 of the first and second nodes 106a and 106b can include instructions executable by the processors 132 to cause the individual processors 132 to provide a hypervisor 140 (identified individually as first and second hypervisors 140a and 140b) and other suitable components (not shown). The hypervisors 140 can individually be configured to initiate, monitor, terminate, and/or otherwise locally manage one or more virtual machines 144 and databases 145 organized into tenant sites 142. For example, as shown in FIG. 1B, the first node 106a can provide a first hypervisor 140a that manages first and second tenant sites 142a and 142b, respectively. The second node 106b can provide a second hypervisor 140b that manages first and second tenant sites 142a' and 142b', respectively.

The hypervisors 140 can be software, firmware, or hardware components. The tenant sites 142 can each include multiple virtual machines 144, databases 145, or other suitable tenant instances for a particular tenant (not shown). For example, the first node 106a and the second node 106b can both host the tenant site 142a and 142a' for a first tenant 101a (FIG. 1). The first node 106a and the second node 106b can both host the tenant site 142b and 142b' for a second tenant 101b (FIG. 1). Each virtual machine 144 can be executing a corresponding operating system, middleware, and/or applications to provide, for example, a Structured Query Language ("SQL") or other suitable types of database service. Each database 145 can include corresponding database records (not shown) stored in the memory 136 or other suitable locations. The database records may be accessed by a database server executed in one of the virtual machines 144.

Also shown in FIG. 1B, the computing system 100 can include one or more virtual networks 146 that interconnect the tenant sites 142a and 142b across multiple nodes 106. For example, a first virtual network 142a interconnects the first tenant sites 142a and 142a' at the first node 106a and the second node 106b. A second virtual network 146b interconnects the second tenant sites 142b and 142b' at the first node 106a and the second node 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the computer network 108 (FIG. 1) even though the virtual machines 144 are located on different nodes 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

FIGS. 2A-2D are schematic diagrams illustrating certain hardware/software components of the distributed computing system 100 in FIG. 1A during certain stages of randomized database selection during a site provisioning process. In particular, FIGS. 2A-2D illustrate the distributed computing system 100 during an initiation stage, a feature addition stage, and a completion stage of a site provisioning process, respectively. In FIGS. 2A-2D, certain components of the distributed computing system 100 are omitted for clarity. For example, only one computing cluster 105 is shown in FIGS. 2A-2D for illustration purposes.

In addition, in FIGS. 2A-2D and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

Figure 2A:
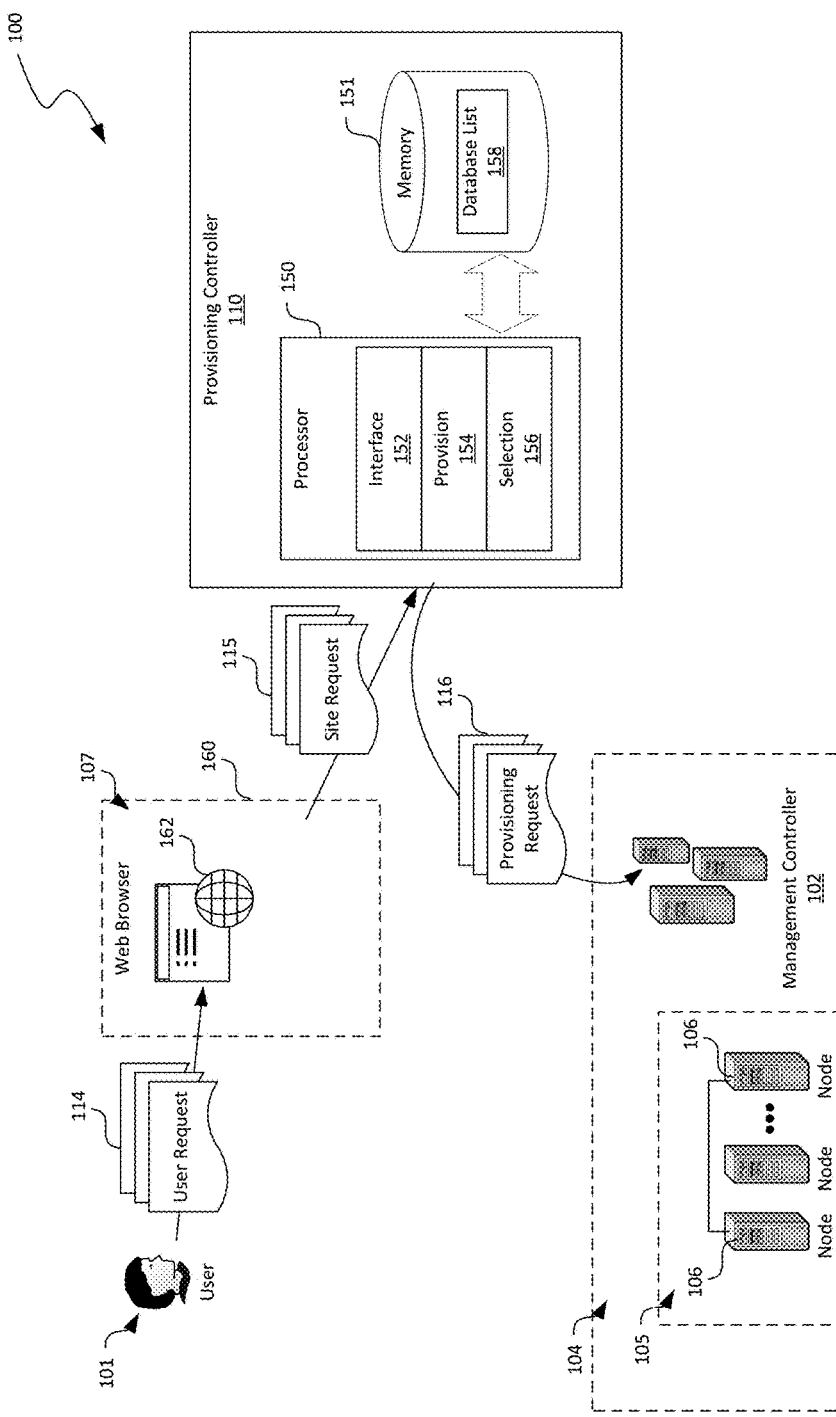
FIGS. 2A-2D are schematic diagrams illustrating certain hardware/software components of the distributed computing system in FIG. 1A during certain stages of a site provisioning process.

As shown in FIG. 2A, a user 101 can access a user portal 107 in a web browser 160 provided by a client device (e.g., a desktop computer, not shown) for requesting a site to be hosted in the distributed computing system 100 of FIG. 1A. The user portal 107 in the web browser 160 can include an input display 162 for accepting such a user request 114. In the illustrated embodiment, the input display 162 includes one or more input fields displayable on the user portals 107 to receive certain description of the site to be deployed. In other embodiments, the input display 162 can include drop-down menus, radio buttons, or other suitable graphical/textual elements for receiving the user request 114.

The user request 114 can include a name, a template, a list of one or more specified features, a location, or other suitable information related to the site. In other embodiments, the user 101 can also provide display configurations, credentials, execution configurations, subscription information, or other suitable data to the web browser 160. In further embodiments, a developer, administrator, or other suitable types of entity can provide the configurations, and/or other suitable information in lieu of or in addition to the user 101. Once the user 101 submits the user request 114, the input display 162 and/or the browser 160 can compile, arrange, annotate, or perform other suitable operations on various information included in the user request 114 in order to create the site request 115 according to suitable protocols of the provisioning controller 110. The web browser 160 on the client device can then transmit the site request 115 to the provisioning controller 110.

As shown in FIG. 2A, the provisioning controller 110 can include a processor 150 operatively coupled to a memory 151. The processor 150 can include a microprocessor, a field-programmable gate array, and/or other suitable logic devices. The memory 132 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 150 (e.g., instructions for performing the methods discussed below with reference to FIGS. 4A-4C). The memory 151 of the provisioning controller 110 can contain instructions (not shown) executable by the processor 150 to cause the processor 150 to provide various software components. For example, as shown in FIGS. 2A-2D, the processor 150 can provide an interface component 152, a provision component 154, and a selection component 156. In other embodiments, the processor 150 can also provide an input component, a display component, or other suitable types of component.

The interface component 152 can be configured to receive the site request 115 or other suitable types of messages from the web browser 160 and forward the messages to the provision component 154 and the selection component 158 for further processing. The interface component 152 can also be configured to transmit a provisioning request 116 to the management controller 102 based on the received site request 115. In certain embodiments, the interface component 152 can include an application programming interface ("API") accessible by the web browser 160. In other embodiments, the interface component 152 can also include a network interface driver or other suitable components configured to allow communications between the web browser 160 and the provisioning controller 110.

The provision component 154 can be configured to process the received site request 115 and generate the a provisioning request 116 to the management controller 102. For example, the provision component 154 can be configured to valid user credentials submitted in the site request 114 to determine whether the user 101 is allowed to create a site. In another example, the provision component 154 can be configured to determine an ownership of the requested site, a tenant of the requested site, access allowance to the requested site, or other suitable parameters of the requested site. Once processed the site request, the provision component 154 can then generate and cause the interface component 152 to transmit the provisioning request 116 to the management controller 102 to initiate the site provisioning process.

Concurrently with or separately from transmitting the provisioning request 116, the selection component 156 can be configured to select a database 145 (FIG. 1B) hosted on one or more of the nodes 106 (FIG. 1A) for storing a configuration file of the site being provisioned by the management controller 102. In certain embodiments, the selection component 156 can first access records of a database list 158 from the memory 151. Based on the accessed database list 158, the selection component 156 can randomly select a first number (M) of databases 145 in the distributed computing system 100. In one particular example, the first number M can be twenty. In other examples, the first number M can be ten, thirty, or any other suitable numbers provided enumeration of M databases does not involve an undesirable amount of delay.

Figure 2B:
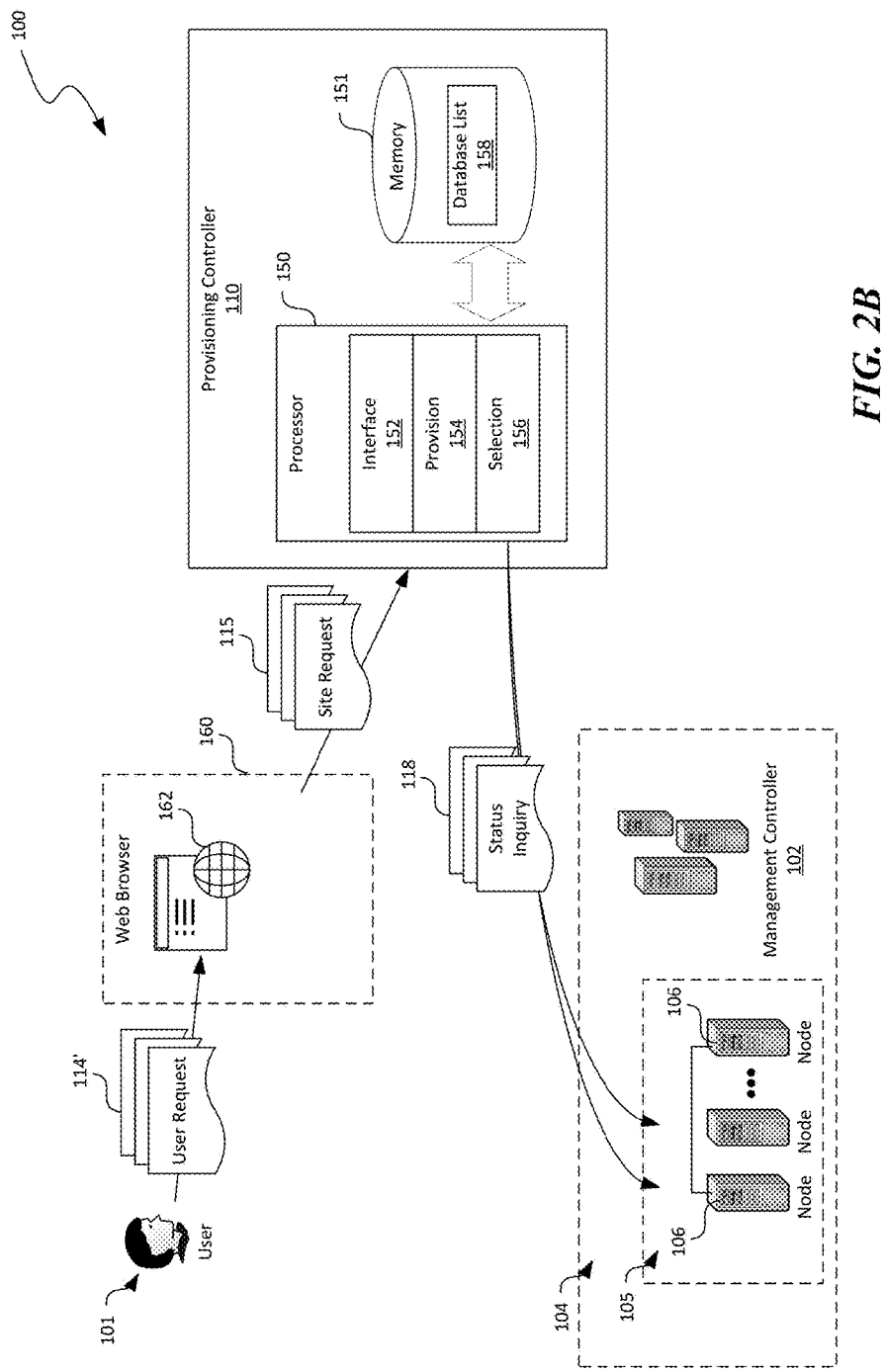
Figure 2C:
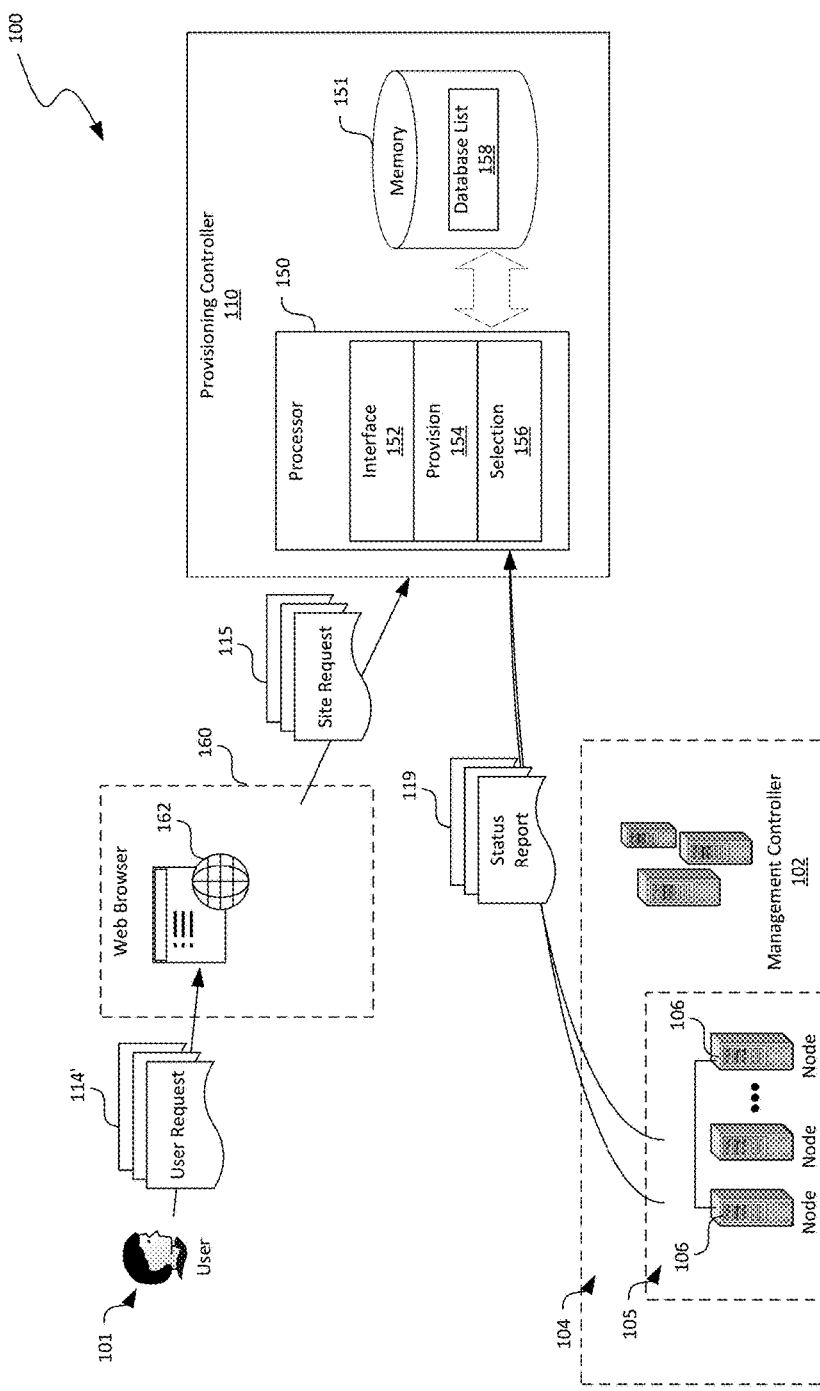

The selection component 156 can be configured to enumerate the randomly selected M databases by, for example, transmitting status inquiries 118 to the nodes 106 at which the selected M databases reside, as shown in FIG. 2B. As shown in FIG. 2C, the nodes 106 hosting the selected M databases can then transmit status reports 119 to the selection component 156 via the interface component 152. The status reports 119 can individually include data representing a number of database operations performed during a period, a number of sites stored, a latency value related to processing certain database commands, or other suitable information related to a status of operating load at the M databases.

The selection component 156 can be configured to process the status reports 119 and determine a second number (N) of databases with the least amount of load from the M databases. For example, the selection component 156 can sort the M databases by the number of sites current stored at each of the M databases in an ascending order. The selection component 156 can then select the top five, six, or any other suitable number of databases from the list of M databases. In other examples, the selection component 156 can also sort in other suitable orders, filter the M databases based on certain performance criteria (e.g., network bandwidth related to each database), or select the second number N databases in other suitable manners.

Figure 2D:
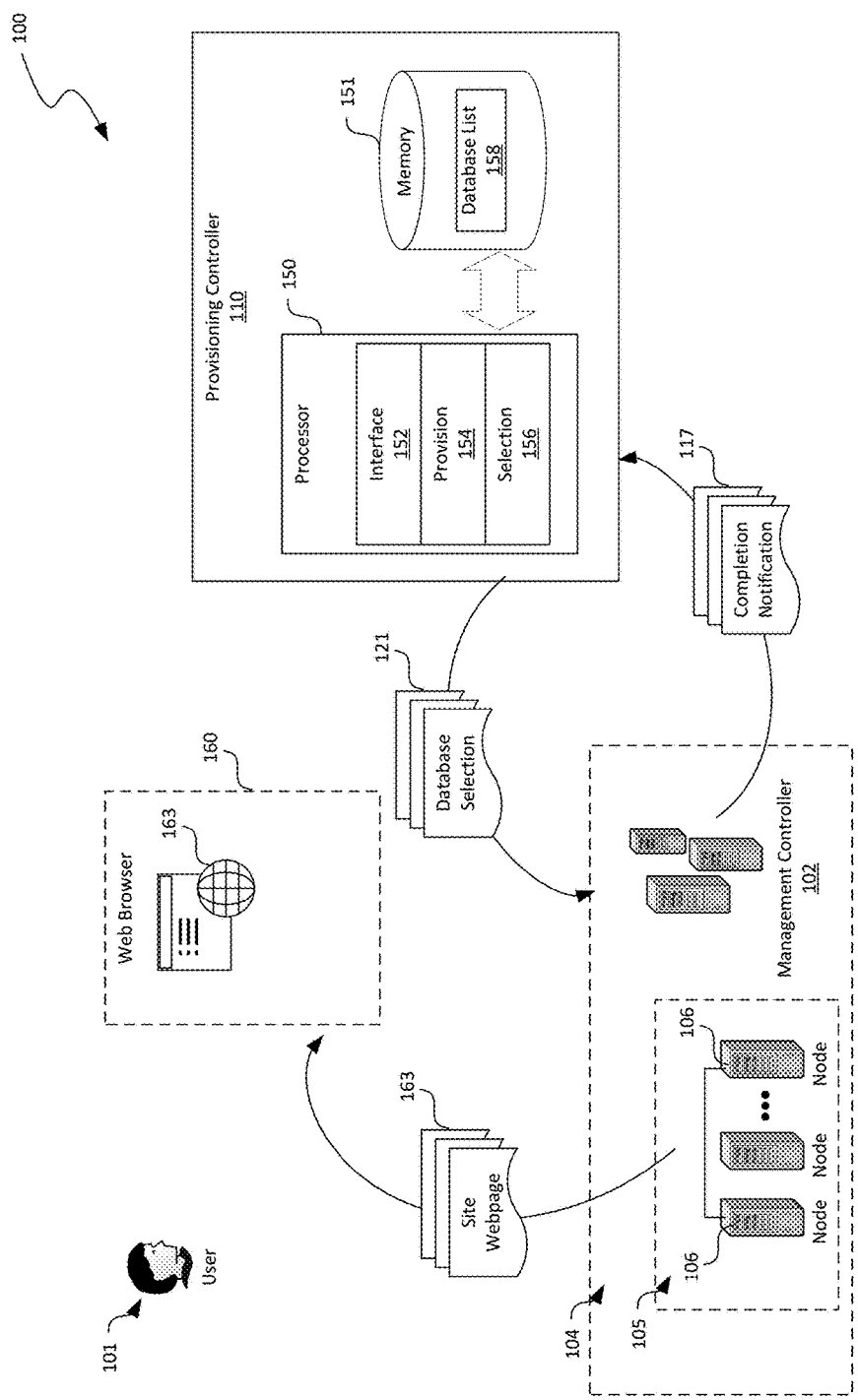

In certain embodiments, once the second number N of databases are selected, the selection component 156 can be configured to randomly select one of the database 145 from the N databases 145 for storing the configuration file of the requested site. The selection component 156 can then generate and cause the interface component 152 to transmit a database selection 121 message containing data indicating or representing the selected database 145 to the management controller 102. In turn, the management controller 102 can store the configuration file of the requested site in the database 145 indicated in the database selection 121 message and provide a completion notification 117 to the provisioning controller 110 indicating completion of the provisioning process for the requested site. As shown in FIG. 2D, the node 106 hosting the database 145 selected to store the configuration file of the site can then allow the user 101 to access the requested site by retrieving the configuration file from the database 145 and providing, for instance, a site webpage 163 to the web browser 160.

In certain embodiments, the first number M and the second number N can be adjusted by an administrator or by the provisioning controller 110 automatically based on suitable criteria. For example, the selection component 156 of provisioning controller 110 can be configured to monitor a duration of enumerating the first number M of databases 145. The selection component 156 can be configured to determine whether an elapsed time between transmitting the status queries 118 and receiving the status reports 119 for all or some of the first number M of databases 145 exceeds a high threshold (e.g., 5 seconds). In response to determining that elapsed time exceeds the high threshold, the selection component 156 can decrease the first number M of databases 145 automatically until the elapsed time does not exceed the high threshold. In other examples, the selection component can also be configured to determine whether the elapsed time is below a low threshold (e.g., 0.5 seconds). In response to determining that elapsed time is below the low threshold, the selection component 156 can increase the first number M of databases 145 automatically until the elapsed time approaches the high threshold. In further examples, the selection component 156 can adjust the first and/or second numbers M and N in other suitable manners.

Figure 3A:
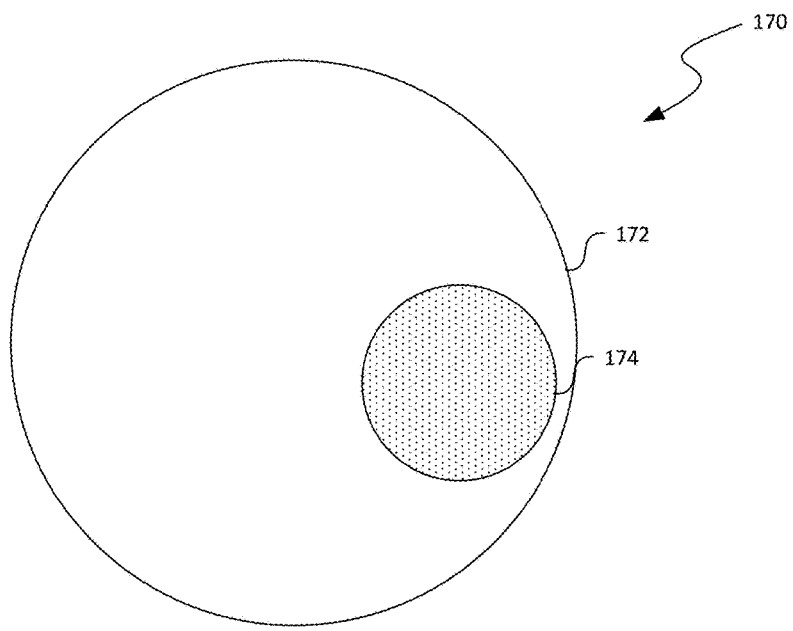
FIGS. 3A-3C are schematic diagrams illustrating a database selection process in accordance with embodiments of the disclosed technology.
Figure 3B:
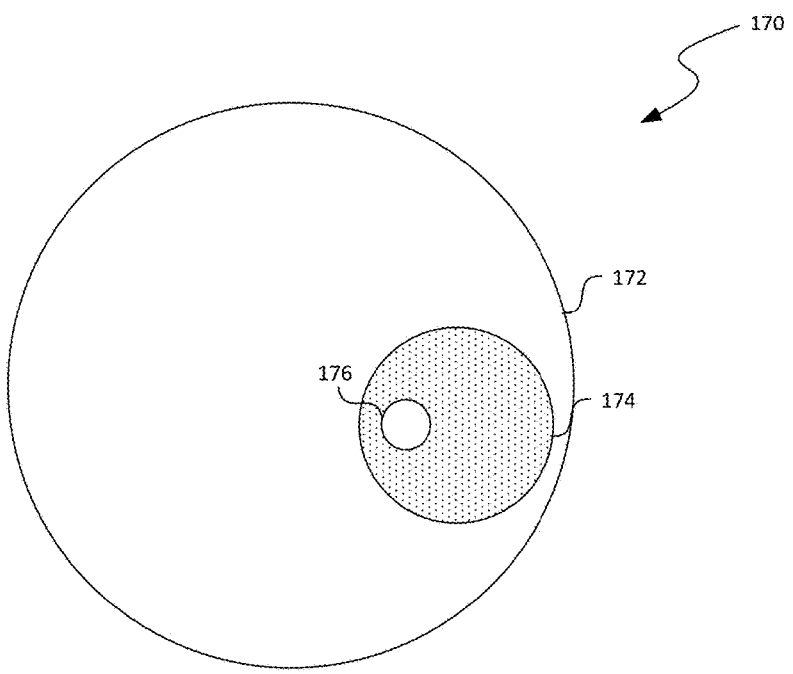
Figure 3C:
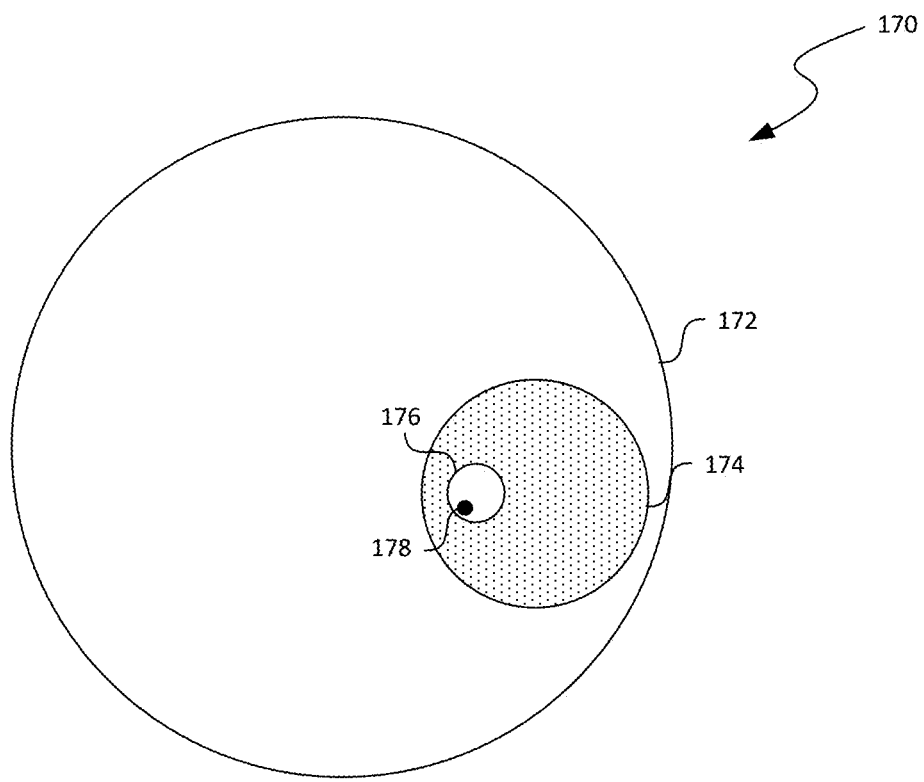

FIGS. 3A-3C are schematic diagrams illustrating a database selection process in accordance with embodiments of the disclosed technology. Even though the process is illustrated with reference to the distributed computing system 100 of FIG. 1A, in other embodiments, embodiments of the process can also be implemented in other computing systems with similar or additional components. As shown in FIG. 3A, the distributed computing system 100 can include a total number of databases 145 (FIG. 1B) hosted therein as represented by the circle 172. As described above with reference to FIGS. 2A-2D, the selection component 156 (FIGS. 2A-2D) can be configured to randomly select a first number M of databases 145 from the total number of databases 145. The selected first number M of databases 145 are represented by the circle 174 in FIG. 3A.

The selection component 156 can then enumerate the selected first number M of databases 145 and select a second number N databases 145 with the least amount of load from the M databases 145. The second number N databases 145 are represented by the circle 176 in FIG. 3B. In certain embodiments, the selection component 156 can then randomly select one database 145, as represented by the circle 178 from the N databases 145 for storing the configuration file of the requested site. It is believed that randomly selecting one database 145 from the N databases 145 can be more conducive to even distribution of database load than selecting a database 145 with the least amount of load because database loads can vary quickly. As such, selecting the database 145 with the least amount of load may result in selecting a database 145 that may be experiencing a sudden increase in load. Thus, randomly selecting one database 145 from the N databases 145 can at least ameliorate such an occurrence.

Figure 4A:
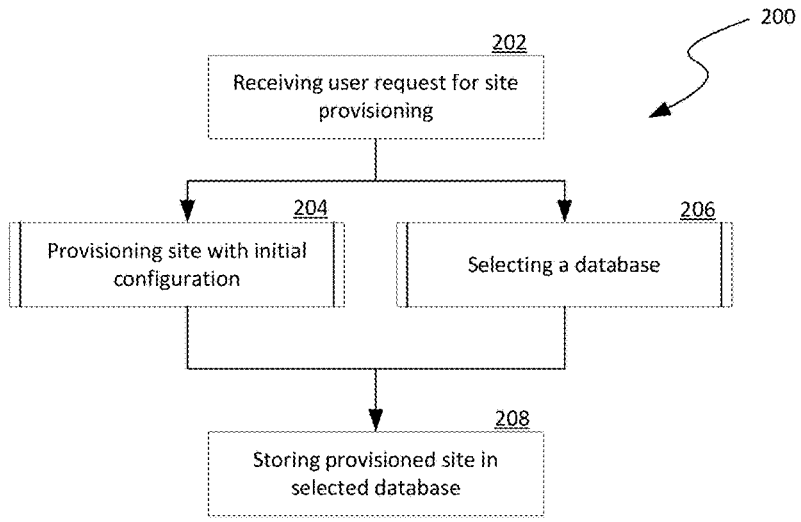
FIGS. 4A-4C are flowcharts illustrating various aspects of processes of database selection during site provisioning in a distributed computing system in accordance with embodiments of the disclosed technology.
Figure 4B:
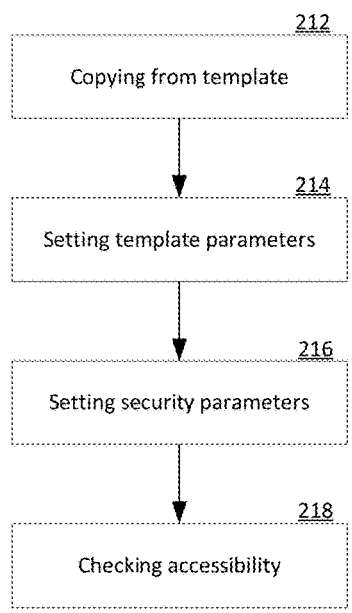
Figure 4C:
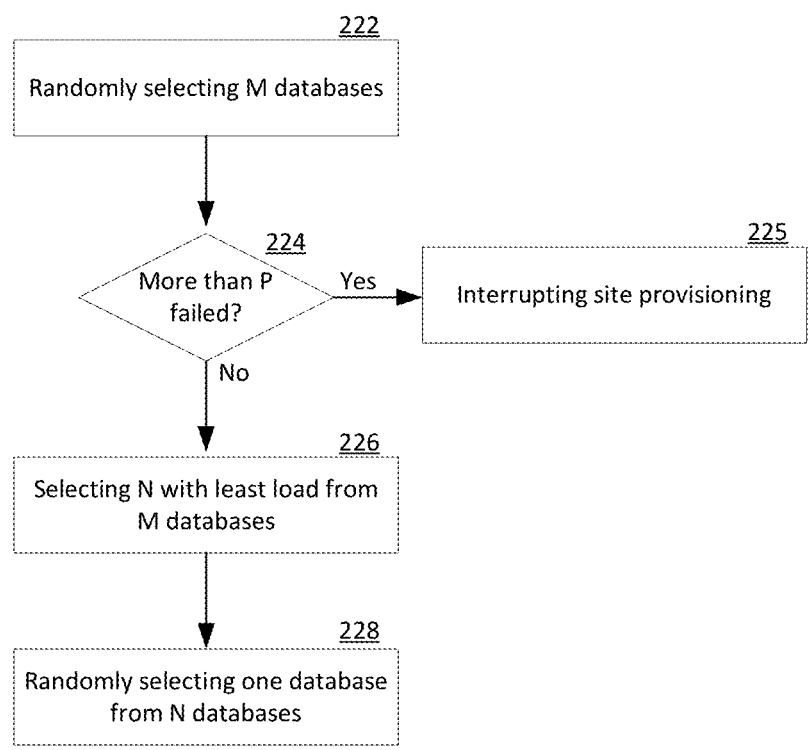

FIGS. 4A-4C are flowcharts illustrating various aspects of processes of database selection during site provisioning in a distributed computing system in accordance with embodiments of the disclosed technology. Even though aspects of the processes are described below with reference to the distributed computing system 100 of FIGS. 1A and 1B, in other embodiments, the processes can also be implemented in other computing systems with different or additional components.

As shown in FIG. 4A, the process 200 can include receiving a user request for initiating site provisioning for a site at stage 202. In certain embodiments, the user request can include a list of features for the site, for example, specified by a user via a dropdown menu or other suitable input fields. The process 200 can then include provisioning the site in the distributed computing system 100 (FIG. 1A) at stage 204. In certain embodiments, provisioning the site can include generating a configuration file for the site. The configuration file can contain data about how the site behaves by controlling module loading, security configuration, session state configuration, and application language, and compilation settings. The configuration file can also contain specific items such as database connection strings or other suitable information. In other embodiments, provisioning the site can also include other suitable operations, examples of which are described in more detail with respect to FIG. 4B.

The process 200 can also include selecting a database in the distributed computing system 100 for storing a configuration file for the requested site. The database is selected such that database loads in the distributed computing system 100 can be generally evenly distributed. As such, the distributed computing system 100 can efficiently process various user requests. Example operations of provisioning the site are described in more detail with respect to FIG. 4C. Upon completion of provisioning the site and selecting the database, the process 200 can include storing the configuration file of the provisioned site in the selected database and enabling the requested site to be accessible to users at stage 210.

As shown in FIG. 4B, provisioning the site can include copying a template to create an instance of a site at stage 212. The template can be specified by the user in the user request, by default, by an administrator, or by other suitable entities. The operations can also include setting template parameters at stage 214. Such parameters can include, for example, ownership of the site, tenancy of the user who requested the site, domain name system parameters, or other suitable parameters. The operations can also include setting security parameters at stage 216. Such security parameters can include, for example, privilege level needed for accessing, modifying, or otherwise interacting with the site. The operations can further include checking accessibility of the site by, for example, transmitting test messages/requests to the provisioned site and ensure that the site can be reached and proper responses are returned.

As shown in FIG. 4C, the operations of selecting the database can include randomly selecting a first number (M) databases 145 from a list of available databases 145 in the distributed computing system 100 (FIG. 1A) at stage 222. The operations can then include a decision stage 224 to determine whether enumeration of a threshold number P of databases 145 have failed. In response to determining that more than the threshold number P of databases 145 have failed to be enumerated, the operations can include interrupting the site provisioning process at stage 225. In one embodiment, interrupting the provisioning process can include terminating the provisioning process and providing the user with an error message. In other embodiments, interrupting the provisioning process can include suspending the provisioning process for a predetermined period (e.g., thirty minutes) and optionally providing the user with a delay message.

In response to determining that no more than the threshold number of databases 145 have failed to be enumerated, the operations can include selecting a second number N of databases 145 with the least amount of load from the first number M of databases 145 at stage 226. For example, in one embodiment, the top five or six databases 145 with the least amount of load can be selected. In other embodiments, the selected second number N of databases 145 can be those each having a load less than a threshold load level, an average load level of the M databases 145, or other suitable threshold. The operations can then include randomly selecting one database from the second number N of databases 145 at stage 228.

Figure 5:
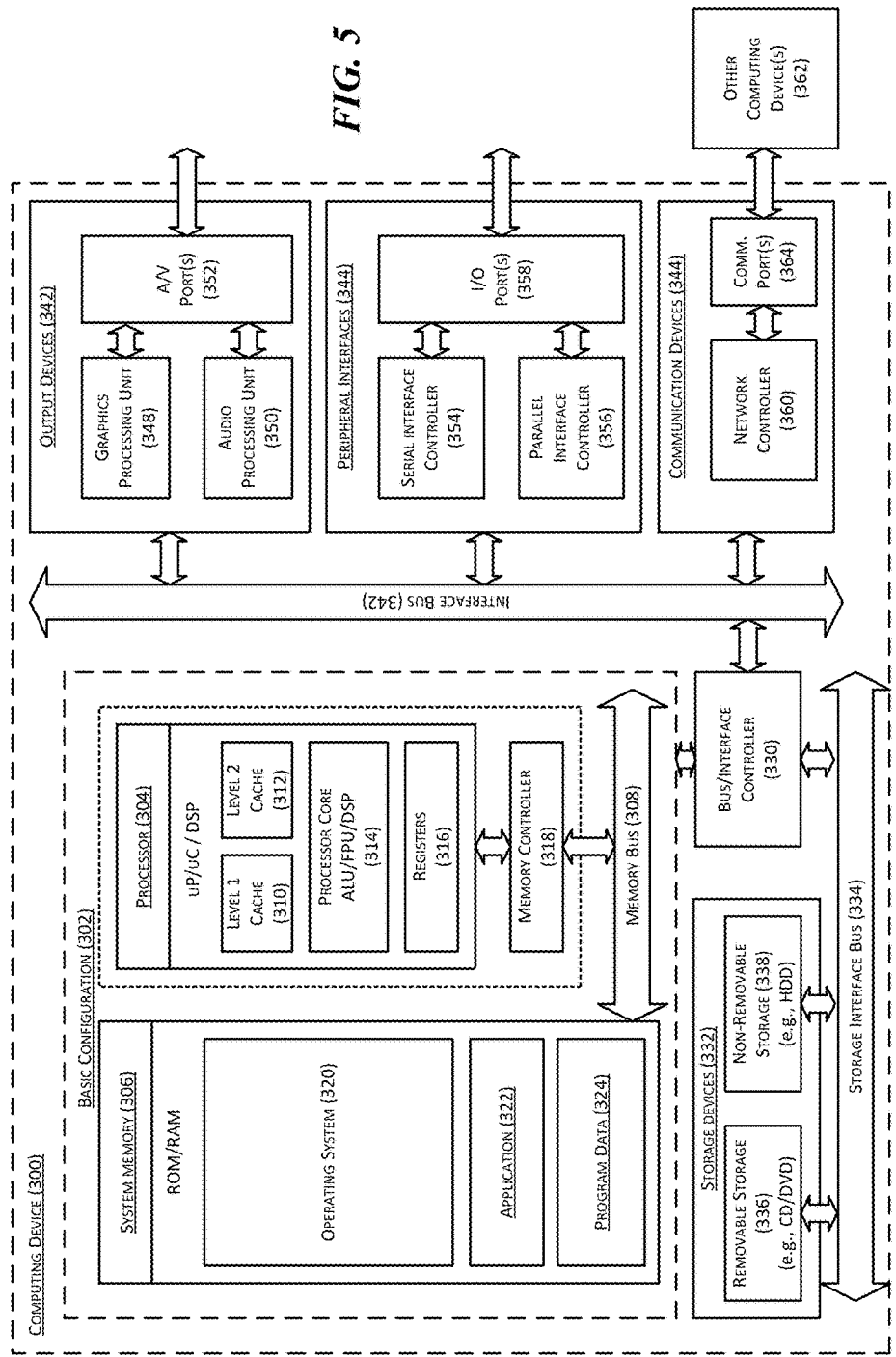
FIG. 5 is a computing device suitable for certain components of the computing system in FIG. 1A.

FIG. 5 is a computing device 300 suitable for certain components of the distributed computing system 100 in FIG. 1A. For example, the computing device 300 can be suitable for the nodes 106, the management controller 102, or the provisioning controller 110 of FIG. 1A. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of database selection during site provisioning in a distributed computing system having multiple nodes individually hosting one or more databases, the method comprising:
  receiving, via a computer network, a user request to initiate a provisioning process for a site to be hosted on one or more nodes in the distributed computing system; and
  in response to the received user request,
    generating a configuration file containing data representing one or more of module loading control, security configuration, session state configuration, application language, or compilation setting of the site;
    selecting one of the databases hosted on the nodes, including:
      randomly selecting a first number of databases from a list of available databases in the distributed computing system;
      determining a second number of databases with lower levels of database load than the other databases from the first number of databases; and
      randomly selecting one database from the determined second number of databases; and
    storing the generated configuration file for the site in the randomly selected one database, thereby achieving a generally even distribution of database loads among the list of available databases in the distributed computing system.

2. The method of claim 1 wherein the generating the configuration file and the selecting one of the databases hosted on the nodes are performed concurrently.

3. The method of claim 1 wherein selecting one of the databases hosted on the nodes further includes:
  transmitting a status query to the individual first number of database, the status query requesting a load status of the individual first number of databases;
  receiving a status report from the individual first number of databases, the status report containing data indicating the requested load status of the individual first number of databases; and
  wherein selecting the second number of databases includes selecting the second number of databases with least amount of load based on the status reports received from the first number of databases.

4. The method of claim 1 wherein selecting one of the databases hosted on the nodes further includes:
  transmitting a status query to the individual first number of databases, the status query requesting a load status of the individual first number of databases;
  receiving a status report from the individual first number of databases, the status report containing data indicating the requested load status of the individual first number of databases; and
  wherein selecting the second number of databases includes:
    sorting the first number of databases by load according to the data contained in the received status reports indicating the load status of the individual first number of databases; and
    selecting the second number of databases with least amount of load from the sorted first number of databases by load.

5. The method of claim 1, further comprising:
  monitoring a number of databases that have failed among the first number of randomly selected databases;
  determining whether the number of databases that have failed exceeds a threshold; and
  in response to determining that the number of databases that have failed exceeds the threshold, interrupting the generating of the configuration file for the site.

6. The method of claim 1, further comprising:
  monitoring a number of databases that have failed among the first number of randomly selected databases;
  determining whether the number of databases that have failed exceeds a threshold; and
  in response to determining that the number of databases that have failed does not exceed the threshold, allowing selection of the second number of databases with least amount of load from the randomly selected first number of databases.

7. The method of claim 1, further comprising:
  in response to another user request to access the site,
    retrieving the configuration file from the database at which the generated configuration file is stored; and
    providing a webpage of the site according to the data contained in the configuration file representing one or more of module loading control, security configuration, session state configuration, application language, or compilation setting of the site.

8. A method of database selection during site provisioning in a distributed computing system having multiple nodes individually hosting one or more databases, the method comprising:

receiving, via a computer network, a user request for a site to be hosted on one or more nodes in the distributed computing system; and in response to the received user request, selecting one of the databases hosted on the nodes, including:
- randomly selecting a set of databases from a list of available databases in the distributed computing system;
- determining a subset of the set of randomly selected databases, the subset of databases each having a lower level of database load than the other databases from the set of databases;
- randomly selecting one database from the subset of databases; and
- storing a configuration file for the site in the randomly selected one database to enable the site to be accessible, the configuration file containing data representing one or more of module loading control, security configuration, session state configuration, application language, or compilation setting of the site.

9. The method of claim 8, further comprising generating the configuration file separately from randomly selecting the one database from the subset of databases.

10. The method of claim 8, further comprising, in response to the received user request:
- transmitting a status query to the individual databases in the randomly selected set, the status query requesting a load status of the individual databases;
- receiving a status report from the individual databases in response to the transmitted status query, the status report containing data indicating the requested load status of the individual databases; and
- wherein determining the subset of databases includes selecting the subset of databases based on the status reports received from the set of databases.

11. The method of claim 8, further comprising, in response to the received user request:
- individually transmitting a status query to the set of databases, the status query requesting a load status of the set of databases;
- receiving a status report from the individual databases from the set, the status report containing data indicating the requested load status of the individual databases from the set; and
- wherein determining the subset of databases includes:
  - sorting the set of databases by load according to the data contained in the received status reports; and
  - selecting a preset number of databases with least amount of load from the sorted set of databases as the subset of databases.

12. The method of claim 8, further comprising:
- monitoring a number of databases that have failed among the set of randomly selected databases;
- determining whether the number of databases that have failed exceeds a threshold; and
- in response to determining that the number of databases that have failed exceeds the threshold, terminating a provisioning process for the site.

13. The method of claim 8, further comprising:
- in response to another user request to access the site, retrieving the configuration file from the database at which the generated configuration file is stored; and
- providing a webpage of the site according to the data contained in the configuration file representing the one or more of module loading control, security configuration, session state configuration, application language, or compilation setting of the site.

14. A computing device in a distributed computing system having multiple nodes individually hosting one or more databases, the computing device comprising:
- a processor; and
- a memory operatively coupled to the processor, the memory containing instructions executable by the processor to cause the computing device to:
  - in response to a received user request for a site to be hosted on one or more nodes in the distributed computing system,
    - randomly select a set of databases from a list of available databases in the distributed computing system;
    - determine a subset of databases each having a level of database load lower than that of the other databases from the randomly selected set of databases;
    - randomly select a single database from the determined subset of databases;
    - provision the site by storing a configuration file of the site in the randomly selected single database, the configuration file containing data representing one or more of module loading control, security configuration, session state configuration, application language, or compilation setting of the site; and
  - provide, via the computer network, a webpage of the site in response to another user request according to the data contained in the configuration file representing the one or more of module loading control, security configuration, session state configuration, application language, or compilation setting of the site.

15. The computing device of claim 14 wherein to randomly select the set of databases includes to randomly select a number of databases from the list of available databases in the distributed computing system, wherein the number of databases randomly selected is adjustable.

16. The computing device of claim 14 wherein:
- to randomly select a set of databases includes to randomly select a first number of databases from the list of available databases in the distributed computing system; and
- to determine the subset of databases includes to determine a second number of databases each having a level of database load lower than that of the other databases from the randomly selected set of databases;
- both the first and second numbers are adjustable based on a current level of database load distribution.

17. The computing device of claim 14 wherein the memory contains additional instructions executable by the processor to cause the computing device to:
- monitor a number of databases that have failed among the set of randomly selected databases;
- determine whether the number of databases that have failed exceeds a threshold; and
- in response to determining that the number of databases that have failed exceeds the threshold, terminating provisioning for the site.

18. The computing device of claim 14 wherein the memory contains additional instructions executable by the processor to cause the computing device to:
- monitor a number of databases that have failed among the set of randomly selected databases;
- determine whether the number of databases that have failed exceeds a threshold; and in response to determining that the number of databases that have failed exceeds the threshold, continuing provisioning the site by storing a configuration file of the site in the randomly selected single database.

19. The computing device of claim 14 wherein the memory contains additional instructions executable by the processor to cause the computing device to:

subsequent to randomly select the set of databases,
transmit a status query to the individual databases in the randomly selected set, the status query requesting a load status of the individual databases;
receive a status report from the individual databases in response to the transmitted status query, the status report containing data indicating the requested load status of the individual databases; and
wherein to determine the subset of databases includes to determine the subset of databases by comparing the load status contained in the received status reports of the databases in the randomly selected set.

20. The computing device of claim 19 wherein:
to randomly selected set of databases includes a number of databases from the list of available databases in the distributed computing system; and
the memory contains additional instructions executable by the processor to cause the computing device to:
determine whether an elapsed time between transmitting the status queries and receiving the status reports exceeds a threshold; and
in response to determining that elapsed time between transmitting the status queries and receiving the status reports exceeds the threshold, decrease the number of databases in the randomly selected set.

* * * * *